Patented Mar. 21, 1939

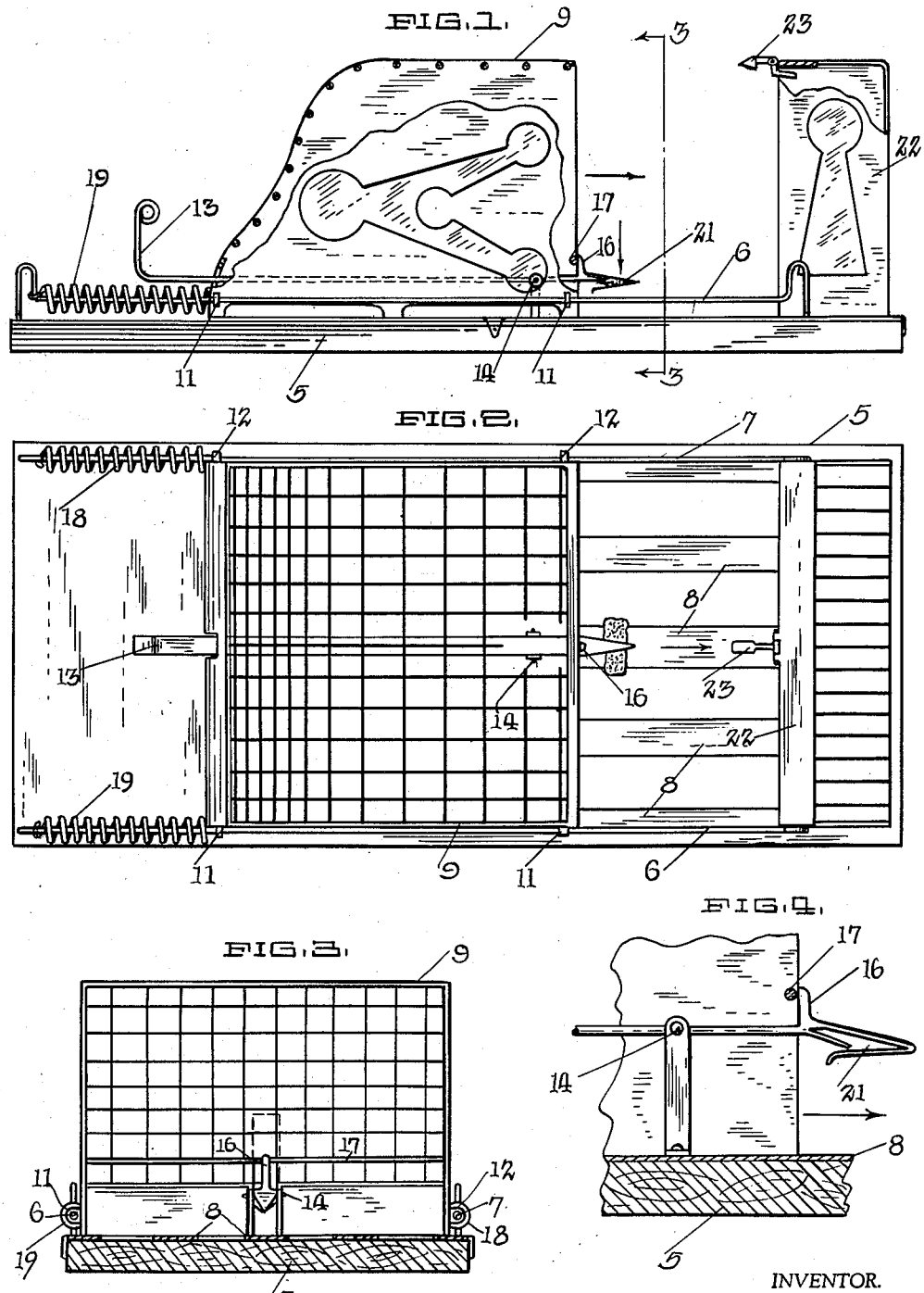

2,151,046

UNITED STATES PATENT OFFICE 2,151,046

ANIMAL TRAP

Rafael C. Porciuncula, San Francisco, Calif.

Application February 21, 1938, Serial No. 191,807

2 Claims. (Cl. 43—60)

This invention relates to improvements in animal traps, and has particular reference to a trap for enclosing the animal so that the same will not be injured during the securing action.

A further object of the invention is to produce a device of this character which is easy to manipulate, and one which will have sufficient room for the animal's comfort previous to removal from the trap.

A further object of the invention is to produce a device of this character, wherein the two parts of the trap will be locked together after the same has been sprung.

Other objects and advantages will be apparent during the course of the following description.

In the accompanying drawing forming a part of this specification and in which like numerals are employed to designate like parts throughout the same—

Fig. 1 is a side elevation, showing a portion thereof broken away;

Fig. 2 is a top plan view of Fig. 1;

Fig. 3 is a cross sectional view taken on the line 3—3 of Fig. 1; and

Fig. 4 is an enlarged fragmentary detail view of the latch.

The ordinary trap for catching animals is liable to hurt the animal, and if the animal is a valuable fur bearing animal it is important that the pelt be not injured during the trapping, as the value thereof would be materially reduced. In the trapping of animals it is also important that there is sufficient room for the animals to move about, otherwise, they are liable to hurt themselves in a confined space. Therefore, applicant has produced a trap which overcomes all of these difficulties.

In the accompanying drawing forming a part of this specification and in which like numerals are employed to designate like parts throughout the same, the numeral 5 designates a base preferably made of wood, into which base is secured runners 6 and 7 and metal strips 8. The strips are sufficiently close together to prevent the animal from gnawing through the base. Slidable on the runners 6 and 7 is a cage 9 held thereto by eyes 11 and 12. A trigger lever 13 is pivoted as at 14 to a suitable support upon the base 5, and has a latch 16 which engages a wire 17 extending across the cage. This wire is sufficiently low to trip the animal as the cage moves along the base, thus interrupting any effort of the animal to run at the initial movement of the trap. Springs 18 and 19 serve to push the cage after the trigger has sprung. Bait is held at 21. Secured to the base is a stationary portion 22 which has a gravity actuating latch 23, which latch is adapted to engage the cage 9 when the same is brought thereagainst.

The operation of my device is as follows: Assuming that the parts are in the position of Fig. 1, an animal enters between the cage and the stationary portion in an effort to secure the bait from the end of the trigger lever. Any downward push will cause the latch 16 to move out of engagement with the cross wire 17. Immediately the springs 18 and 19 will move the cage 9 along the runners 6 and 7 and into engagement with the stationary portion 22. The cross wire 17 will move against the animal's legs, tripping the animal, and before the animal can gain his feet, the cage will have moved into engagement with the stationary portion, and the latch 23 will have performed its latching operation. In order to remove the animal, it is merely necessary to lift the latch 23 and separate the parts, and by re-engaging the latch 16 with the wire 17 the trap is again ready for use.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a device of the character described, a base, a pair of runners mounted on said base and parallel to the side margins thereof, a cage slidable on said runners, a stationary portion mounted on said base adjacent one end of said runners, springs mounted on opposite ends of said runners and adapted to engage said cage for forcibly moving said cage against said stationary portion, and trigger means for holding said cage against the tension of said springs.

2. In a device of the character described, a base, a pair of runners mounted on said base and parallel to the side margins thereof, a cage slidable on said runners, a stationary portion mounted on said base adjacent one end of said runners, springs mounted on opposite ends of said runners and adapted to engage said cage for forcibly moving said cage against said stationary portion, and trigger means for holding said cage against the tension of said springs, said trigger means including a lever pivoted to said base and having an upstanding latch, said latch engaging a restraining wire connected to said cage.

RAFAEL C. PORCIUNCULA.